United States Patent [19]

Davidian

[11] 4,448,826

[45] May 15, 1984

[54] CASKET COATING

[75] Inventor: Michael Davidian, Darien, Ill.

[73] Assignee: Ameritek, Inc., Villa Park, Ill.

[21] Appl. No.: 402,955

[22] Filed: Jul. 29, 1982

[51] Int. Cl.[3] .......................... B32B 1/02; B32B 1/06

[52] U.S. Cl. .......................................... 428/35; 27/3; 27/11

[58] Field of Search .......................... 27/3, 11; 428/35

[56] References Cited

U.S. PATENT DOCUMENTS

| | | | |
|---|---|---|---|
| 182,228 | 9/1876 | Rodgers | 27/11 |
| 1,963,681 | 6/1934 | Scott | 27/11 |

*Primary Examiner*—James R. Hoffman

*Attorney, Agent, or Firm*—Andrus, Sceales, Starke & Sawall

[57] ABSTRACT

A coating composition to be applied to a metal casket to prevent corrosion thereof. The coating comprises a film forming matrix containing dispersed particles of an alkaline material capable of neutralizing the finite amount of organic acids contained in the casket to thereby prevent acidic corrosion of the casket. The coating can also contain an anti-oxidant to prevent oxidative corrosion of the metal casket, and a bacteriacide to prevent microbial growth within the casket. Through use of the coating, a stable, substantially neutral condition is produced in the casket.

8 Claims, No Drawings

CASKET COATING

BACKGROUND OF THE INVENTION

A substantial proportion of caskets are contained within crypts in above ground mausoleums. It has been found that the metal casket is prone to deterioration through corrosion by organic acids contained within the casket, as well as by oxidative corrosion. The oxidation of formaldehyde used as the embalming fluid generates formic acid, and the decomposition of the human remains also generates other organic acids which will attack and corrode the metal casket, resulting in the destruction of the casket and leakage of acidic components. The leakage of acid from the casket can stain discolor and damage the marble crypt.

In addition, the putrefication of the human remains in the casket due to microbial growth can cause undesirable odors in the crypt and mausoleum.

Attempts have been made in the past to prevent the corrosion of metal caskets by the application of various types of coatings to the interior casket surface. Asphalt coatings have been commonly used to coat caskets, but the asphalt coating is easily undermined by the organic acids and the coating does little to protect the metal casket from acidic corrosion.

In the past, amine salts have also been placed in caskets and over a period of time the salts sublime or vaporize. The vapors condense on the walls of the casket to form a protective coating in an attempt to halt corrosion. However, the amine salts have not been satisfactory in combating acidic corrosion caused by organic acids.

Polyurethane foam has also been used as a coating on the interior of metal caskets, but as in the case of asphalt coatings, the polyurethane foam does not inhibit the corrosive action of the acid vapors on the uncoated areas.

Furthermore, none of the conventional casket coatings, as used in the past, have inhibited bacterial growth in the casket.

SUMMARY OF THE INVENTION

The invention is directed to an improved coating composition for the internal surface of a metal casket which will protect the casket from both acidic and oxidative corrosion, as well as inhibiting microbial growth. More particularly, the coating comprises a film forming matrix, consisting of a resin or rubber, containing dispersed particles of an alkaline material, such as a metal carbonate or bicarbonate. The alkaline material is capable of neutralizing the finite amount of organic acids, such as formic acid, contained in the casket to thereby prevent acidic corrosion of the metal casket.

In addition, the coating composition can also contain an anti-oxidant, such as metal oxide, which pre-vents oxidation of the metal casket.

Microbial growth within the casket is prevented by the addition of bacteriacide in the coating composition.

The ingredients of the coating composition are mixed with an evaporable carrier, such as water or a solvent, and applied to the interior surface of the casket by brushing, dipping, spraying, or the like. On evaporation of the carrier, a thin coating results having a thickness in the range of about 1 to 5 mils.

It is preferred to utilize a film former which will form a moisture permeable coating and as the organic acids permeate through the coating, they will be neutralized by the alkaline materials contained within the coating to thereby prevent acidic corrosion of the metal casket. The organic acid salts generated through the neutralization act as strong reducing or anti-oxidant agents, which in turn aid in protecting the metal from oxidative corrosion.

The coating composition of the invention is relatively inexpensive and will completely neutralize the finite amount of organic acids containing within the casket to prevent acidic corrosion of the metal. The formation of organic acid salts through the neutralization, along with addition of anti-oxidants in the coating, will prevent oxidative corrosion of the metal casket.

In addition, the incorporation of the bacteriacide will prevent microorganism growth and eliminate the possibility of offensive odors being developed.

Therefore, the coating produces a stable, substantially neutral condition in the casket to prevent corrosion of the metal casket.

DESCRIPTION OF THE ILLUSTRATED EMBODIMENT

In accordance with the invention, a resin-base coating is applied to the interior surface of a metal casket and the coating contains dispersed particles of an alkaline material capable of neutralizing the finite amount of organic acids present in the casket.

The casket itself can be a conventional type and is normally formed of steel or copper and, as such, can be subjected in use to both acidic and oxidative corrosion.

In general, the corrosion resistant coating is composed of 5% to 75% by weight of a film former, and the balance being the alkaline materials, based on a dry or 100% solid basis. The maximum amount of formic acid present in the casket can be calculated from the quantity of formaldehyde used as the embalming fluid, and therefore, the amount of alkaline material used in the coating should be in excess of that required to neutralize the formic acid as well as any small amount of other organic acids generated through body decomposition.

The particular material used as the film former or base is not critical and can take the form of resins such as acrylic, acrylic-styrene copolymers, phenolic, epoxy, polyolefins, such as polyethylene an polypropylene, vinyl chloride and vinyl chloride copolymers, alkyd, styrene and styrene copolymers. Rubber and chlorinated rubber can also be used.

The acid neutralizing material can be any alkaline material which is capable of neutralizing the finite amount of organic acids present in the casket. Preferably the alkaline material is in the form of a finely divided solid or filler, which can be dispersed throughout the liquid film former. Metal carbonates, bicarbonates and oxides are preferred and may take the form of calicum carbonate, zinc carbonate, magnesium carbonate, sodium carbonate, zinc oxide, calcium oxide, magnesium oxide, sodium oxide, aluminum oxide, sodium bicarbonate, calcium bicarbonate, and the like.

The coating is preferably applied to the metal casket surface as an emulsion with the emulsion containing from about 10% to 70% of a volatile or evaporable carrier and the balance being the coating composition. Water is preferred as the carrier, although other solvents, such as alcohol, acetone, or the like can be used.

The emulsion can be applied to the inner surface of the casket by spraying, brushing, dipping, rolling, or the like, and after evaporation of the water or other carrier, a thin continuous coating having a thickness of about 0.5 to 15 mils, is obtained. It is preferred to use a resin film former that will produce a moisture permeable coating. The permeable nature of the coating permits the organic acids to penetrate the coating and contact the particles of the neutralizing material which are dispersed throughout the coating, thereby more effectively neutralize the organic acids. With a moisture impervious coating, only the alkaline particles on the coating surface will be exposed to the organic acids so that a greater proportion of alkaline material may be required to effect the neutralization.

The neutralization process converts the formic acid and other organic acid to organic salts, and the organic salts act as strong reducing agents, or anti-oxidants which, in turn, aid in protecting the metal casket from oxidative corrosion.

In addition, other anti-oxidant materials in the amount of 0.1% to 20% by weight can be incorporated in the composition. The anti-oxidants can take the form of any conventional reducing agents that would be compatible with the composition, such as alkali metal nitrites exemplified by sodium or potassium nitrite, or metal oxides, such as zinc oxide, calcium oxide, magnesium oxide, sodium oxide, and the like.

To inhibit microorganism growth in the casket, a bacteriacide, such as 2-n-octyl-4-isothiazoline-3-one, benzyl bromoacetate, or the like can be included in an amount of about 0.1% to 0.5% of the dry weight of the coating composition.

The coating composition can also contain small amounts of other ingredients. For example, wetting agents, such as sodium carboxylated polyelectrolyte, can be incorporated in an amount up to 5% of the formulation to aid in wetting and distributing the dry fillers throughout the resin film former.

Coloring materials, such as carbon black, titanium dioxide and the like can also be included in an amount up to 5% by weight of the composition.

Coalescing agents, such as methyl cellusolve, which are high boiling point solvents can also be incorporated in the coating in an amount up to 5% by weight and tend to fuse the particles together.

Small amounts of pH adjusters, such as ammonium hydroxide, can also be included in an amount up to 5% by weight to provide a pH generally in the range of about 8.2 to 8.6 for the emulsion. A pH in this range minimizes gelling and maintains the desired viscosity of the liquid emulsion before application to the casket.

In addition, small amounts up to 5% by weight of an anti-freeze, such as ethylene glycol, and thickeners for the emulsion, such as hydroxyethyl cellulose, can also be included in the formulation.

To prepare the composition of the invention, the granular or powdered alkaline material, such as the metal oxides, carbonates and bicarbonates, are added to water, along with the wetting agent and mixed at high speed to obtain a slurry. The thickener, as well as the resin film former can be added during the mixing. Following this, the coalescing agents, anti-freeze, coloring material, and the sodium nitrite deoxidizer can then be added to the emulsion and the pH adjusted through the addition of a material, such as ammonium hydroxide. The composition is then applied to the metal casket by spraying, rolling, brushing, or dipping, and on evaporation of the water, or other carrier, a thin continuous coating is produced.

The coating of the invention is relatively inexpensive to produce and serves to completely neutralize all acidic components in the casket, as well as preventing oxidative corrosion. The addition of the bacteriacide will also inhibit microorganism growth to thereby eliminate offensive odors.

Through the invention, the corrosive agents in the casket are effectively neutralized, and as the casket is sealed and there can be no further influx of corrosive agents, the neutral, stable condition will remain indefinitely to protect the casket.

The following examples illustrate the formulations of the coating falling with the invention in weight percent:

EXAMPLE I

| | |
|---|---|
| Acrylic copolymer water emulsion (50%) | 49.2 |
| Calcium carbonate | 43.8 |
| Zinc oxide | 1.4 |
| 2-n-oxtyl-4-isothiazoline-3-one | 0.2 |
| Water | 4.6 |
| Sodium nitrite | 0.8 |
| | 100.0 |

EXAMPLE II

| | |
|---|---|
| Polyvinyl chloride or copolymer water emsulsion (50%) | 64.4 |
| Calcium carbonate | 27.2 |
| Magnesium oxide | 2.5 |
| Benzyl bromoacetate | 0.2 |
| Water | 4.2 |
| Potassium nitrite | 1.5 |
| | 100.0 |

EXAMPLE III

| | |
|---|---|
| Styrene butadiene | 18.0 |
| Magnesium carbonate | 45.0 |
| Magnesium oxide | 10.0 |
| 2-m-octyl-4-isothiazoline-3-one | 0.4 |
| Water | 25.0 |
| Sodium nitrite | 1.6 |
| | 100.0 |

EXAMPLE IV

| | |
|---|---|
| Acrylic styrene copolymer | 23.6 |
| Water | 28.0 |
| Ethylene glycol | 2.2 |
| Calcium carbonate | 44.2 |
| Zinc oxide | 1.3 |
| 2-n-oxtyl-4-isothiazoline-3-one (microbocide) | 0.2 |
| Sodium carboxylated polyelectrolyte | 0.1 |
| Hydroxyethyl cellulose | 0.3 |
| Ammonium hydroxide | 0.1 |
| | 100.0 |

Various modes of carrying out the invention are contemplated as being within the scope of the following claims particularly pointing out and distinctly claiming the subject matter which is regarded as the invention.

I claim:

1. A casket construction, comprising an enclosed metal casket containing in use a finite quantity of organic acids, and a coating applied to the interior surface of the casket to prevent corrosion thereof, said coating comprising a film forming matrix having dispersed therein particles of an alkaline material in an amount sufficient to neutralize said finite amount of organic acids.

2. The casket construction of claim 1, wherein said coating comprises from 5% to 75% by weight of said matrix and the balancing being said alkaline material.

3. The casket construction of claim 1, wherein said matrix is a material selected from the group of resins and rubber.

4. The casket construction of claim 1, wherein said coating composition also contains from 0.1% to 20% of an anti-oxidant.

5. The construction of claim 4, wherein said anti-oxidant is selected from the group consisting of metal oxides and an alkali metal nitrite.

6. The casket construction of claim 1, wherein said coating also contains from 0.1% to 0.5% of a bacteriacide to inhibit microbial growth in the casket.

7. The casket construction of claim 1, wherein said coating is moisture permeable.

8. The casket construction of claim 1, wherein said alkaline material is selected from the group consisting of metal carbonates, metal bicarbonates, metal oxides and mixtures thereof.

* * * * *